(No Model.)

D. NEEFUS, Jr.
EGG BOX.

No. 484,863. Patented Oct. 25, 1892.

SECTION ON R-S.

SECTION ON X-Y.

WITNESSES:　　　David Neefus Jr.　　INVENTOR
Annie C. Davis
　　　　　　　　　　　　　　　　　BY
Susan O. Fellows　Albert D. Pentz　ATTORNEY.

THE NORRIS PETERS CO., PHOTO-LITHO., WASHINGTON, D. C.

UNITED STATES PATENT OFFICE.

DAVID NEEFUS, JR., OF ELIZABETH, NEW JERSEY.

EGG-BOX.

SPECIFICATION forming part of Letters Patent No. 484,863, dated October 25, 1892.

Application filed December 4, 1891. Serial No. 413,996. (No model.)

*To all whom it may concern:*

Be it known that I, DAVID NEEFUS, Jr., a citizen of the United States, and a resident of Elizabeth, in the county of Union and State of New Jersey, have invented certain new and useful Improvements in Egg-Boxes, of which the following is a specification.

The object of this invention is to improve egg-carriers, in which each egg is held within its own separate cell and in which the quantity of eggs present in the carrier is apparent at sight.

This invention is designed to improve the egg-carrier patented to Seth H. Smith May 27, 1873, No. 139,431.

This invention also improves the patent issued to myself and Lee Miller December 13, 1881, No. 250,674. This latter patent has an expensive and clumsy cover and catch which this present invention avoids.

Figure 1:
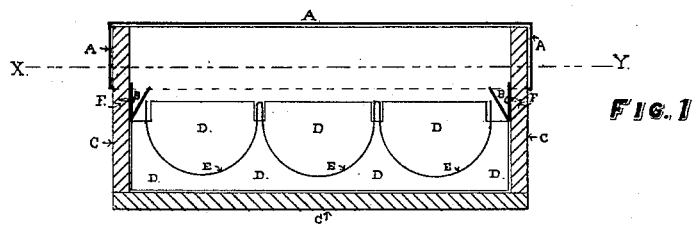
Figure 2:
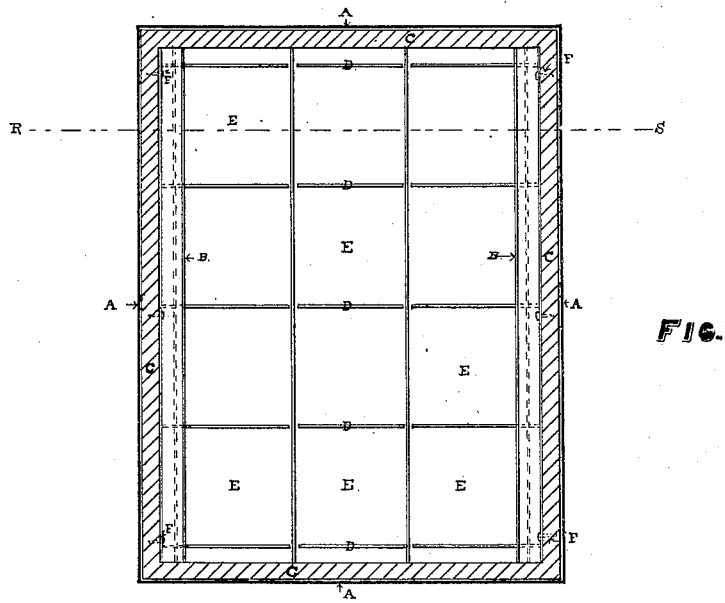

In the drawings, Figure 1 is a vertical section through R S of Fig. 2, and Fig. 2 is a horizontal section cut through X Y of Fig. 1.

The case C is a tray furnished with one nest of cells only, and it is arranged to receive eggs in either even dozens or even parts of dozens, so that if each cell has an egg the amount of dozens or parts of dozens in the carrier is known at a glance. This tray is made from wood tightly joined in any ordinary manner, so that air will not be admitted through its sides, corners, or bottom. This tray is like that of the case A in the Neefus and Miller patent before named; but here it is made deeper to accommodate the whole egg. The cap A covers the whole top of the tray and extends downward on all sides a considerable distance. This cap is made from paper-board and is joined to exclude air. It is fitted quite snugly to the outer walls of the tray, so that air may not freely be admitted between them. It is here made of one sheet of paper-board, and it is joined, after the edges are turned down at right angles, securely and tightly at the corners by lapping the square corner flap, which is made from the excess of material gained in turning down the edges over the joint. The cells of this carrier are those of the Seth H. Smith patent, before indicated. These cells are made from the notched plates D and the slotted sheet E, as shown in the Smith patent. These plates D and the sheet E are here made from stiff paper. The sheet is perforated by fifteen slots, each of which is wide enough to admit one of the plates D and long enough to form the outline of one of the semicircular cells shown in Fig. 1. The buffers B are V-shaped strips of elastic paper-board bent to shape and fastened to the tray C by the nails F. They extend the entire length of the box C and necessarily, if shorter, must be long enough to protect each egg-cell contiguous to them. They hold down the nest of cells to its proper place, make elastic cushions, which prevent the eggs from breaking by contact with the walls of the tray C, and also, if necessary, keep the edges of the sheet E in position, as in Fig. 1. The height from the bottom of the cells to the cap A is slightly greater than an egg, so that when an object is laid upon the cap A it will be supported by the walls of the tray C and not by eggs within the carrier. When eggs are within this carrier and the cap A is in place, it is designed when the carrier shall be suddenly overturned that the atmospheric pressure on the cap A will prevent the weight of the eggs from quickly forcing the cap off the tray with disastrous results; but, on the contrary, the tray may easily be righted before harm comes to its contents.

I claim—

1. A rectangular parallelopipedal tray made from suitable materials and practically airtight, a cap or cover for the open top of this tray and having a form and character like unto it and closely overlapping and embracing the sides of the said tray, in combination with a well-known nest of cells formed by interweaving a slotted sheet of paper and a number of notched plates of paper, arranged within the tray, and means, as the buffer B, to secure the nest of cells in place and attached to the inner walls of the tray in a position to overhang the ends of the said nest of cells, substantially as shown and described.

2. The combination of a suitable tray of rectangular shape, a cap or cover of rectangular form arranged upon and about the open top of the said tray, a slotted sheet of paper and notched plates of paper interwoven, making a nest of well-known cells within the tray, and a V-shaped buffer, of elastic material, arranged between the nest of cells and the walls of the tray, substantially as shown and described.

3. The combination of a rectangular parallelopipedal tray made practically air-tight, a cap, of form and character like unto the tray, covering its open top and closely embracing its sides, a well-known nest of cells arranged within the tray and made from a slotted sheet of paper interwoven with a number of notched plates of paper, and an elastic buffer situated within and attached to the walls of the tray contiguous to the nest of cells and above their ends, substantially as shown and described.

Signed at Elizabeth, in the county of Union and State of New Jersey, this 30th day of November, A. D. 1891.

DAVID NEEFUS, Jr.

Witnesses:
HENRY D. SAUNDERS,
F. A. PRICE.